Dec. 2, 1958  G. A. PEIRCE  2,862,790
SULFAMIC ACID PURIFICATION
Filed Dec. 27, 1955
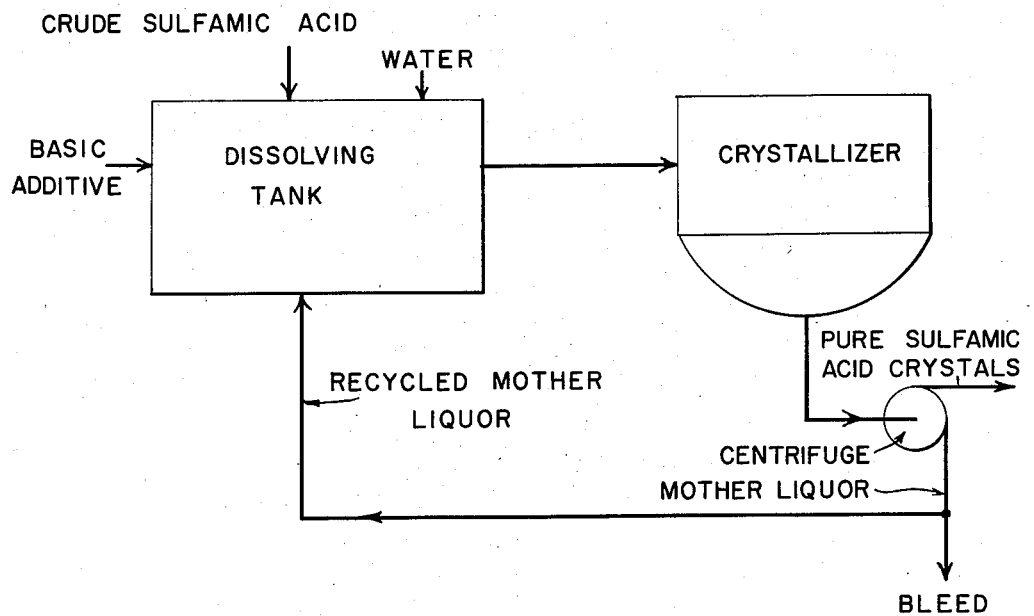
INVENTOR
GEORGE A. PEIRCE
BY *Robert J. Reichert*
ATTORNEY

2,862,790
SULFAMIC ACID PURIFICATION

George A. Peirce, Westfield, N. J., assignor to E. I. du Pont de Nemours and Company, Wilmington, Del., a corporation of Delaware Application December 27, 1955, Serial No. 555,418

7 Claims. (Cl. 23—166)

This invention relates to a process for the preparation of high purity crystalline sulfamic acid.

Sulfamic acid is prepared commercially by the reaction of urea and oleum. The crude reaction product ordinarily contains about 90% sulfamic acid and 10% of sulfuric acid and ammonium bisulfate as impurities.

In the past this crude reaction product has been purified by dissolving it in hot water to give a solution that is substantially saturated with sulfamic acid. This solution is then cooled, thereby precipitating out of solution a part of the dissolved sulfamic acid. Often the solution is also concentrated by vacuum evaporation of water to increase the amount of sulfamic acid that precipitates. The sulfamic acid crystals are then separated from the mother liquor by a centrifuge.

Sulfamic acid thusly purified contains no appreciable quantity of the sulfuric acid or ammonium bisulfate impurities because the crude sulfamic acid solution is not cooled sufficiently to reach the saturation points of these impurities.

In most instances the mother liquor from the centrifuge is recycled for use as the crude sulfamic acid dissolving liquor.

Of course a certain amount of sulfuric acid and bisulfate impurities must be removed from the mother liquor. This can be done in many ways. Perhaps the simplest way is to bleed a sufficient amount of the recycle liquor from the system. This effectively limits the concentration of sulfuric acid and ammonium bisulfate, thereby preventing these impurities from building up to the saturation point and crystallizing out of solution along with the sulfamic acid product. Sufficient water is added to the recycle liquor to make up for any that is removed from the system by evaporation or by bleeding of the recycle liquor.

Disregarding evaporation concentration, the maximum amount of purified sulfamic acid that can be obtained during a single pass of a given amount of dissolving liquor is determined by the solubility of the sulfamic acid in the liquor at the dissolving and crystallizing temperatures. Thus under fixed temperature conditions the maximum production of purified sulfamic acid per pound of liquor processed is equal to the difference in solubility, measured in weight per pound of solvent, of sulfamic acid in the liquor at the dissolving and crystallizing temperatures.

I have found that the amount of purified sulfamic acid produced per pound of liquor processed can be markedly increased by adding to the crude sulfamic acid aqueous dissolving liquor a basic additive of the type hereinafter described.

The basic additives that are effective in increasing pure sulfamic acid production are those basic compounds that are water soluble in the amounts used and that do not react with the sulfuric acid in the liquor to form insoluble sulfates. The preferred additives form sulfates that are water soluble at least up to about 30% concentration at 40° C. Of course the additive should not react with other ingredients in the liquor, such as the sulfamic acid, to form a precipitate.

Typical of the better additives are alkali metal oxides, hydroxides and sulfamates; also any source of ammonia that doesn't introduce undesirable impurities into the liquor, such as liquid or gaseous ammonia, ammonium hydroxide and ammonium sulfamate. Best results have been obtained using various ammonia compounds as basic additives, with ammonia and ammonium sulfamate being about the easiest to handle.

Although even extremely small additions of basic additives are beneficial, it is preferred to add sufficient additive to the liquor to maintain a mol ratio of total cation to total sulfate of at least 1.0. Of course, the additive should not be added in so great an amount as to cause crystallization of either the sulfamate or sulfate of the additive cation, thereby contaminating the product.

In computing the total cation to total sulfate ratio, the mols of $NH_4^+$ introduced with the crude sulfamic acid as ammonium bisulfate and the mols of additive cation, such as $Na^+$, $K^+$ or $NH_4^+$, introduced as basic additive are totaled to give the total cation molar concentration. The hydrogen ion concentration is not included in computing total cation. The total sulfate molar concentration equals the sum of all sulfate present in the liquor, whether as sulfate salt, bisulfate salt or sulfuric acid.

As aforementioned, the preferred basic additives are ammonia compounds. Ammonia additions in amounts to bring the ammonia to sulfate ratio above the aforementioned preferred minimum have been found to increase the output of actual production apparatus as much as 60%.

Not only does my method increase the pure sulfamic acid yield, but also it has been found to have several other important advantages. It has been found that the ammoniation of the dissolving liquor drastically reduces the corrosiveness of the liquor toward the stainless steel equipment. Typical of the decreased corrosiveness are the results of one test that showed the untreated liquor to corrode AISI 316 stainless steel at a rate of 0.0079 inch/month whereas after ammoniation the corrosion rate was only 0.0011 inch/month, or less than $\frac{1}{7}$ as great. This decreased corrosiveness of course greatly prolongs the life of the expensive stainless steel equipment used in sulfamic acid purification.

Another added advantage in this method is that for some reason the rate of hydrolysis of sulfamic acid to ammonium bisulfate is significantly lower in the ammoniated dissolving liquor than it is in untreated liquor. This cuts down on the hydrolysis loss of sulfamic acid during the purification treatment.

Except for the addition of the basic additive to the dissolving liquor, the purifying process can be carried out in accordance with the above described conventional technique. Thus, the desired amount of additive can be added to the dissolving liquor, which is heated by the heat of solution of the sulfamic acid to the desired dissolving temperature, usually in the range of 50 to 70° C. After or simultaneously with the addition of the additive, sufficient crude sulfamic acid is mixed with the dissolving liquor to give a substantially saturated solution with respect to sulfamic acid at the dissolving temperature. Some cooling of the dissolving tank may be required to keep the dissolving liquor from being overheated from the heat of solution of the sulfamic acid.

The thusly treated crude sulfamic acid solution is then cooled, such as by means of conventional crystallizer apparatus. A crystallizing temperature in the range of 30 to 45° C. ordinarily is used.

Upon cooling of the saturated solution, sulfamic acid crystallizes out. This is separated from the slurry by a conventional centrifuge or similar apparatus. If desired, the remaining liquor can be recycled, after removal of some of the sulfuric and bisulfate impurities such as by bleeding. Also evaporation during crystallization can be used to increase the product yield.

In order that the practice and advantages of the present invention can be better understood, the following examples in addition to those set forth above are given:

*Example 1*

Crude sulfamic acid is purified in the recycle system shown in the drawing. The purification run is started by charging water at 40° C. into the dissolving tank and starting it circulating through the system. Sufficient dry crude sulfamic acid is then added to the dissolving tank to substantially saturate the dissolving liquor in the tank with respect to sulfamic acid. The liquor in the dissolving tank is agitated to promote the dissolving of the sulfamic acid. Upon adding the sulfamic acid, the water temperature rises to 50° C., where it is maintained by regulating the flow of cooling water through a cooling coil in the dissolving tank.

The saturated sulfamic acid solution, at a temperature of 50° C., is then passed to the crystallizer at the rate of 20,800 pounds of solvent per hour. The temperature of the liquor in the crystallizer is dropped to 40° C. by conventional heat exchange means. Substantially pure crystalline sulfamic acid precipitates from the solution.

The cooled liquor from the crystallizer is then passed to a centrifuge where the crystalline sulfamic acid product is removed from the slurry.

The mother liquor leaving the centrifuge is still at a temperature of about 40° C. and is substantially saturated with sulfamic acid. It also contains in solution the ammonium bisulfate and sulfuric acid impurities. Mother liquor is bled from the system as shown at a rate of 112 pounds per hour, sufficient to give a 12% sulfuric acid and a 21.6% ammonium bisulfate concentration when the operation of the system is stabilized.

The mother liquor is then recycled to the dissolving tank. Sufficient water is also added to the dissolving tank to make up for the water lost from the system by bleeding and so forth. Crude sulfamic acid is continuously added to the dissolving tank at a rate of about 388 pounds per hour, sufficient to maintain the dissolving liquor substantially saturated with respect to sulfamic acid.

When the system has stabilized under those conditions, pure sulfamic acid product is obtained at a rate of 350 pounds per hour. That is, 1.68 pounds of pure sulfamic acid is produced per 100 pounds of sulfamic acid-free liquor processed.

The cation (ammonia) to sulfate mol ratio in the liquor in this stabilized system is 0.6, figuring the total cation as the ammonia in the ammonium bisulfate and the total sulfate as the sum of the sulfate in the ammonium bisulfate and the sulfuric acid from the crude acid.

After the purification system has reached equilibrium as described above, liquid ammonia is introduced into the dissolving tank at the rate of 7.6 pounds per hour, to increase the cation to sulfate mol ratio in the liquor from 0.6 to 1.5. Addition of crude sulfamic acid to the dissolving tank in sufficient amount to substantially saturate the dissolving liquor with sulfamic acid is continued, which now requires 620 pounds of crude sulfamic acid per hour. The amount of liquor bled from this system and likewise the amount of water added to the dissolving tank are not changed.

It is found that the rate of delivery of purified sulfamic acid from the centrifuge increases proportionally as the ammonia to sulfate ratio is increased. At the final ammonia to sulfate mol ratio of 1.5, purified sulfamic acid is produced at the rate of 560 pounds per hour, that is, 2.68 pounds of purified sulfamic acid per 100 pounds of sulfamic acid-free liquor processed. Thus, by the addition of an auxiliary source of ammonia to the system whereby the ammonia to sulfate mol ratio is raised from 0.6 to 1.5, there is obtained a 59.5% increase in the rate of production of purified sulfamic acid.

Even more outstanding results are obtainable by practicing the present invention in accordance with this example using crystallizing apparatus that concentrates the liquor by water evaporation while cooling the liquor.

*Example 2*

The procedure of Example 1 is followed using a molar equivalent addition of ammonium sulfamate in place of the liquid ammonia addition of Example 1. Substantially identical production results are obtained.

*Example 3*

A series of three production runs are made in accordance with the procedure of Example 1 using molar equivalent additions of sodium hydroxide, sodium sulfamate, potassium sulfamate and potassium oxide in the respective runs in place of the ammonia of Example 1. In each run the production rate is greatly increased by the addition of the basic additive.

The mother liquor bled from the system in each of these runs is used as a source of alkali metal sulfamate, thereby improving the economics of the operations.

*Example 4*

Sulfamic acid is purified in accordance with the procedure of Example 1, but operating at a dissolving temperature of 65° C. and a crystallizing temperature of 35° C.

By operating at this greater temperature differential, a much greater production increase percentagewise is obtained when the ammonia addition is being made to the dissolving liquor.

I claim:

1. The process of purifying sulfamic acid comprising dissolving sufficient impure sulfamic acid containing a sulfate impurity in an aqueous liquor to prepare a substantially saturated aqueous solution of impure sulfamic acid; adding to said aqueous solution a basic compound selected from the group consisting of ammonia, ammonium hydroxide, ammonium sulfamate, alkali metal oxides, alkali metal hydroxides and alkali metal sulfamates, said basic compound being added in an effective amount and in an amount insufficient to cause crystallization out of said solution of sulfamate or sulfate of the cation of said basic compound; cooling the aqueous solution to precipitate high purity crystalline sulfamic acid; and removing the precipitated sulfamic acid from the cooled solution.

2. The process in accordance with claim 1 wherein said basic compound is added in sufficient amount to give a total cation to sulfate mol ratio in the aqueous liquor of at least 1.0.

3. The process in accordance with claim 1 wherein said basic compound is soluble in said aqueous liquor up to about a 30% by weight concentration at 40° C.

4. The process in accordance with claim 1 wherein said basic compound is an alkali metal compound.

5. The process in accordance with claim 1 wherein said basic compound is ammonia.

6. The process in accordance with claim 1 wherein said basic compound is ammonium hydroxide.

7. The process in accordance with claim 1 wherein said basic compound is ammonium sulfamate.

References Cited in the file of this patent

UNITED STATES PATENTS 2,487,480    Rohrmann _____ Nov. 8, 1949